E. G. FISCHER.
SOUNDING APPARATUS.
APPLICATION FILED MAR. 6, 1917.
1,244,485.
Patented Oct. 30, 1917.
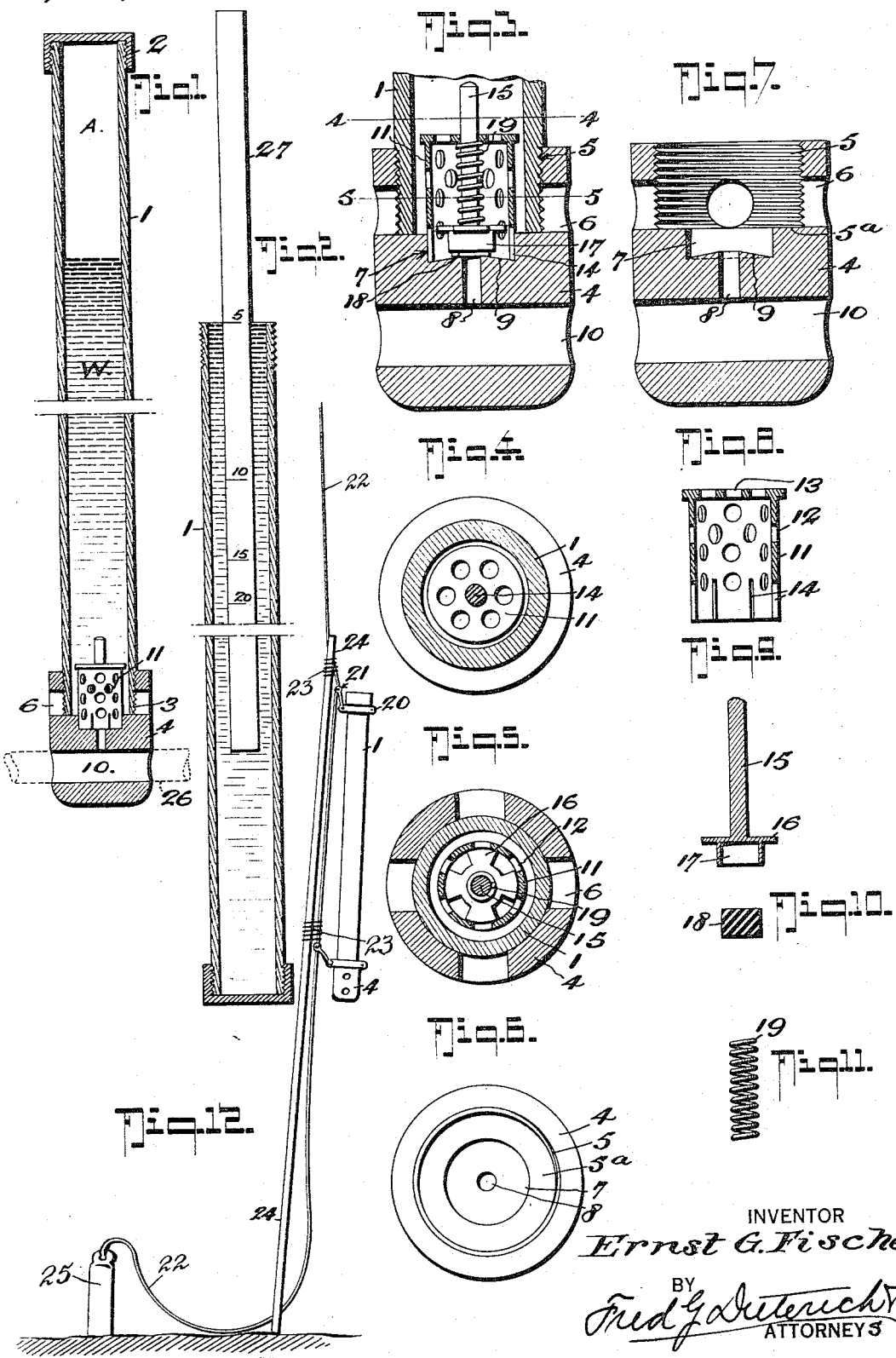
INVENTOR
Ernst G. Fischer
BY
Fred G. Dieterich
ATTORNEYS

UNITED STATES PATENT OFFICE.

ERNST G. FISCHER, OF WASHINGTON, DISTRICT OF COLUMBIA.

SOUNDING APPARATUS.

1,244,485.   Specification of Letters Patent.   Patented Oct. 30, 1917.

Application filed March 6, 1917. Serial No. 152,626.

*To all whom it may concern:*

Be it known that I, ERNST G. FISCHER, residing at the city of Washington, in the District of Columbia, have invented certain new and useful Improvements in Sounding Apparatus, of which the following is a specification.

My invention relates to certain new and useful improvements in devices designed for measuring the depth of bodies of water in oceans, bays, harbors and the like, and it particularly has for its object to provide an instrument whereby depth measurements (fathoms) may be read with considerable accuracy and in a convenient and expeditious manner. In the art, as heretofore practised, sounding devices have been provided which employ a glass tube, one end of which is closed, and the interior of which is provided with a covering of some substance that will have its color or appearance changed by the chemical action of the water as it enters the tube to compress the air ahead of it, thereby giving an indication of the depth of the water. Other devices have been employed, also using the air-spring idea, but instead of employing a chemical substance on the glass, they employ a strip of paper having a suitable chemical which will change color as the water enters the tube. The objection to the foregoing instruments is that they can only be read once for a given depth or less *i. e.*, they will register only up to the maximum depth and after registering a maximum depth they cannot be used for registering lesser depths.

Other instruments employ a glass tube having the interior ground or roughened which, by wetting it, indicates the height to which the water has risen during the immersion of the tube and thus indicates the depth to which the tube has been immersed, and other instruments have been used in the art employing glass tubing with the air-spring in which the water is trapped in the tube and the quantity of water affords an indication of the depth, and others are provided in which a piston works against the tension of a metal spring and the piston rod is provided with a self-adjusting indicator that is automatically set to indicate the maximum depth to which the instrument is lowered and will remain set until returned to zero by the operator. All of the devices heretofore employed, with which I am familiar, have been found objectionable in actual use where accurate sounding devices are required, that is, sounding devices which will give indications with smallest possible error, (this accuracy being especially necessary in soundings made for use in the construction of charts). It has been found that when several different instruments are simultaneously let down, or several instruments of the same make are let down, there is a wide difference in their respective readings, due principally, perhaps, to the fact that where glass tubing is employed, it is quite difficult, often impossible, in practice, to obtain glass tubing having absolutely uniform internal cross sectional area throughout the entire length, which lack of uniformity makes commercial graduating of the instruments a very difficult and inexact method, since hardly two glass tubes can be found which are alike. It is therefore another object of my invention to eliminate the use of glass tubing in an instrument of this character and to employ metal tubing in place of the glass tubing since metal tubing of practically absolutely uniform cross section can be obtained.

My invention in its general nature provides an instrument in which the water is trapped under the pressure of the greatest depth to which the instrument is lowered and is held under such pressure until the instrument is withdrawn for reading and the pressure released by the operator, the reading of the instrument being accomplished by the introduction of a graduated rod of known volume into the sounder tube, after which the trapped water is displaced sufficiently to bring its level to a predetermined place (the mouth of the tube) and a direct reading on the rod scale is thus obtained, the scale being graduated for the purpose. In order to get accurate measurements the water trapped in the instrument must be held at the pressure obtained at the lowest depth, and its volume must not be diminished by leakage during the time the instrument is being withdrawn from the water, and it is therefore another object of my invention to provide a device in which all possibility of leakage or reduction in the volume of the trapped water is eliminated.

With other objects in view, that will hereinafter be apparent, the invention also includes those novel features of construction, combination and arrangement of parts, all of which will first be fully described, then be specifically pointed out in the appended claims, and illustrated in the accompanying drawings, in which:—

Figure 1 is a vertical longitudinal section of one of my instruments showing the same as having been lowered to effect a sounding, the water being indicated by W and the air-spring by A.

Fig. 2 is a central, vertical longitudinal section of the tube inverted with the cap removed, and the reading rod introduced, the rod being introduced sufficiently to bring the water to the mouth or outlet of the tube and give the direct reading on the rod.

Fig. 3 is an enlarged vertical longitudinal section of the lower end of the rod with the removable cap in place.

Fig. 4 is a cross section on the line 4—4 of Fig. 3.

Fig. 5 is a cross section on the line 5—5 of Fig. 3.

Fig. 6 is a plan view of the cap shown in Fig. 7.

Fig. 7 is a vertical longitudinal section of the removable cap, *per se*.

Fig. 8 is a vertical central longitudinal section of the valve cage.

Fig. 9 is a central vertical longitudinal section and part elevation of the valve stem and guide.

Fig. 10 is a central vertical longitudinal section of the rubber valve disk.

Fig. 11 is a side elevation of the valve spring.

Fig. 12 is a side elevation showing the device in use.

In the drawing, in which like numerals and letters of reference indicate like parts in all of the figures, 1 represents a section of brass tubing which, in practice, is preferably two feet long and of an internal diameter of say one-half inch, although the length and diameter of tubing employed is a matter of design and I do not wish to be limited to any particular dimensions.

The upper end of the tube 1 is closed by a cap 2 which is soldered or otherwise permanently secured in place while the lower end of the tube 1 is externally threaded at 3 and is designed to receive a cap 4, the construction of which and of the valve carried by it forms one of the features of improvement of my device.

The construction of the cap 4 and the valve coöperating with it is best shown in Fig. 3 *et seq.* of the drawing, by reference to which it will be noticed that the cap 4 is provided with a threaded bore 5 and is also provided with cross bores or ports 6, the lower edges of which are in the same plane as the bottom of the bore 5, the bottom of the bore 5, at 5ᵃ, forming a seat for the lower end of the tube 1, against which the seat end of tube 1 is adapted to be held with sealing pressure, by virtue of the threaded connection 3 between the tube 1 and the cap 4, the purpose of the opening 6 being to permit escape of air from the tube 1, when the cap 4 is being screwed into place, so that when the valve is seated and the cap is screwed onto the end of the tube the air within the tube will not be compressed beyond atmospheric pressure.

The cap 4 is counterbored at 7 and has an incline or coniform valve seat 9, around the bore 8, through which the water is designed to enter the tube, the bore 8 registering with a cross bore 10 in the cap. In practice, the cubical content of the counterbore 7 is designed to equal the cubical content of the material forming the valve cage (see Fig. 8) the valve and valve spring (see Figs. 9 to 11, inclusive) so that the displacement of water due to the volume of the parts shown in Fig. 8 *et seq.* in the tube 1 will be compensated for by the additional space in the counterbore 7, thus when the water has entered tube 1 in use, the reading of the water level, as indicated in Fig. 2, will not be affected by reason of the displacement due to the valve cage and its parts.

11 designates the valve cage which consists of a metallic cylinder perforated, as at 12, to permit free passage of water and provided with a valve stem bearing 13, the cylinder 11 being slit at its lower end, as at 14, so that it may be seated in the counterbore 7 with retaining friction.

15 is the valve stem which is provided with winged guides 16 and a receptacle 17 for the valve disk 18, the disk 18 being preferably formed of a rubber composition. 19 is the valve spring which continuously tends to seat the valve.

In practice, the parts are assembled as indicated in Fig. 1, the cap 4 being tightly screwed onto the end of the tube and the tube being emptied of fluid, (except air). The air is at atmospheric pressure and the valve is seated under the influence of the very light spring 19. As the instrument is lowered the pressure of the water causes water to enter through the bores 10 and 8 into the tube 1 and opens the valve against the resistance of the valve spring and the resistance of the air-spring in the tube, and the amount of water which will be forced into the tube and the amount to which the air in the tube will be compressed, will depend upon the depth to which the instrument is lowered. As the instrument is being lowered, the pressure within the instrument and that on the outside of the instrument tend to become balanced, and were it not for the provision of the light spring 19, the valve would not immediately seat so that if the instrument be drawn up slowly enough, the valve would remain unseated and the water from the inside of the tube would flow out again. Of course, if a quick pull on the instrument to raise it is had, the valve would seat by reason of the difference of pressure formed by such quick action, but, as before stated, if the withdrawal be very slow there is danger of leakage and hence I have provided the light spring 19 to hold the valve on its seat with sufficient pressure to maintain the sealing contact even though the instrument be drawn up slowly.

In practice, the instrument is held with clamps 20 by snap hooks 21 of the ordinary type that are fastened on the stray line 22, the stray line being provided with a stiffening stick 24 that is secured to it at intervals 23 to protect the instrument by preventing the bottom of the sounder from striking, and the stray line also carries the sinker 25, as is the usual practice, and I make no claim to the method of securing my sounder to the stray line or the construction of the stray line and its parts, *per se*.

In order to effect a reading of the instrument after it has been withdrawn, the instrument is turned upside down and the cap 4 unscrewed. The bore 10 facilitates this action in that a tool 26 (see Fig. 1) may be provided to go into the bore 10 and act as a wrench for unscrewing and screwing up the cap 4.

After the cap has been removed, a rod 27 is introduced (see Fig. 2) until the water level reaches the mouth of the tube 1 and a reading on the rod is taken at that level. The rod being graduated to give direct readings will thus enable the user to immediately determine the depth to which the instrument had been lowered.

In practice, where the tube is of a half inch inside diameter, I prefer to provide the navigator with a series of rods 27, say three rods, one of one-quarter inch, one of five-sixteenths and one of three-eighths inch diameter, each rod being graduated to read fathoms between certain definite limits, thus making it quite convenient for the navigator to read practically any depth to which the instrument had been lowered, it being understood, of course, that at the shallower depths less water enters the tube 1 than at the greatest depths and hence for measuring the shallower depths the largest rod would be employed, since the water in the tube has to be displaced through a greater distance before it reaches the level of the mouth of the tube.

After the reading has been taken, the water is emptied out of the tube and the cap screwed on again when the instrument will be ready for a second use.

Furthermore it should be understood, if the sounder is lost, as sometimes occurs when the stray line fouls up, the navigator does not lose his indicating rods, as one set of indicating rods can be used in connection with a plurality of sounding instruments, thus making the expense for a loss of the instrument much less than is the case with the instruments now on the market in which the indicators are an attached part of the instrument.

With my construction, it will be seen that I provide a positive means for trapping the water and fully preventing any leakage of the same, thus rendering the instrument of especial value in survey work, where great accuracy is required.

It should be mentioned that the pressure of the spring is taken into consideration when graduating the rod scales so that due allowance for the spring pressure will be made.

From the foregoing description taken in connection with the accompanying drawing, it is thought the complete construction, operation and advantages of my invention will be readily understood by those skilled in the art.

What I claim is:—

1. A sounder comprising a tube closed at one end to inclose an air-spring, a cap detachably threaded to the other end of said tube, said cap having a water inlet passage to the interior of the tube, and a valve device, for closing said passage, wholly supported by said cap, said cap having ports for releasing the air while screwing the cap onto the tube.

2. A sounder comprising a tube permanently closed at its upper end to inclose an air-spring, a cap detachably threaded on the lower end of said tube, said cap having a water inlet passage to the interior of the tube, a valve device, for closing said passage, wholly supported by said cap, said valve device comprising a valve cage, a valve movable within said cage and a spring for holding said valve seated.

3. In an instrument of the character stated, the combination with the tube closed at one end to inclose an air-spring, of a cap removably mounted on the other end of said tube in air-tight connection with the same, said cap having a recess, a valve cage held in said recess, said cap having a water passage leading into said valve cage, a valve working within said valve cage, and means for releasing the air while the cap is being replaced on the tube to prevent the air within the tube from being put under greater than atmospheric pressure by the act of reapplying the cap and means coöperative with said valve for continuously tending to maintain said valve seated, substantially as shown and described.

4. In an instrument of the character stated, the combination with the tube closed at one end to inclose an air-spring, of a cap removably mounted on the other end of said tube in air-tight connection with the same, said cap having a recess, a valve cage held in said recess by retaining friction, said cap having a water passage leading into said valve cage, a valve working within said valve cage, and means coöperative with said valve for continuously tending to maintain said valve seated, substantially as shown and described.

5. A sounder comprising a tube, one end of which is closed whereby said tube will inclose an air-spring, the other end of said tube being threaded, a cap having a threaded recess to fit onto said tube and close the end of the same, said cap having transverse bores registering with said recess, the lower edge of the said transverse bores registering with the seating surface of said cap recess, said cap having a transverse bore and a longitudinal bore registering with said transverse bore and communicating with the interior of the tube, and a check valve coöperating with said longitudinal bore for holding the water under pressure within the tube.

6. A sounder comprising a tube, one end of which is permanently closed and the other end is threaded, a cap removably threaded onto said threaded end of said tube and having a seat to engage the end of said tube with sealing contact, said cap having a recess, a valve cage held in said recess with retaining friction and adapted to project into said tube, a valve carried by said cage, said cap having a water inlet bore terminating in a valve seat whereby said bore may be closed by said valve, and means continuously tending to seat said valve.

7. In a sounding apparatus, a tube hermetically sealed at one end, a removable cap secured on the other end of said tube, said cap having a water passage into said tube, and means carried by said cap and coöperating with said water passage to hold the water trapped in said tube under its maximum pressure, said means comprising a valve structure wholly supported by said cap and projecting into said tube.

8. In a sounding apparatus, a tube hermetically sealed at one end, a removable cap secured on the other end of said tube, said cap having a water passage into said tube, means carried by said cap and coöperating with said water passage to hold the water trapped in said tube under its maximum pressure, said means comprising a valve structure wholly supported by said cap, said cap having means for releasing air while said cap is being screwed into place with said valve closed to prevent the placing of the air within the tube under pressure during the putting on of the cap.

9. In a sounder of the class described, a metal sounding tube adapted to receive water when the sounder is immersed and having provisions for retaining the water under the pressure of immersion until the sounding tube has been drawn up, of a fathom scale rod adapted to be inserted into the tube when opened to displace the water to a given extent and thereby indicate the depth to which the sounder has been immersed.

ERNST G. FISCHER.